United States Patent
Burdick et al.

(10) Patent No.: US 7,783,865 B2
(45) Date of Patent: Aug. 24, 2010

(54) CONDITIONAL DATA WATCHPOINT MANAGEMENT

(75) Inventors: Dean Joseph Burdick, Austin, TX (US); Basu Vaidyanathan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 11/832,418

(22) Filed: Aug. 1, 2007

(65) Prior Publication Data

US 2009/0037703 A1  Feb. 5, 2009

(51) Int. Cl.
*G06F 11/36* (2006.01)

(52) U.S. Cl. .................. 712/227; 717/127
(58) Field of Classification Search .................. None
See application file for complete search history.

(56) References Cited

U.S. PATENT DOCUMENTS

| | | | |
|---|---|---|---|
| 5,388,233 A * | 2/1995 | Hays et al. | 712/208 |
| 6,035,422 A * | 3/2000 | Hohl et al. | 714/35 |
| 6,077,312 A * | 6/2000 | Bates et al. | 717/129 |
| 6,336,087 B2 * | 1/2002 | Burgun et al. | 703/15 |
| 7,047,520 B2 * | 5/2006 | Moore et al. | 717/129 |
| 7,409,330 B2 * | 8/2008 | Kumamoto | 703/22 |
| 2002/0078329 A1 * | 6/2002 | Roth et al. | 712/227 |
| 2002/0184477 A1 * | 12/2002 | Swaine et al. | 712/227 |
| 2003/0079159 A1 * | 4/2003 | Ten-Hove et al. | 714/34 |
| 2005/0289396 A1 * | 12/2005 | Hooper et al. | 714/34 |
| 2006/0277438 A1 * | 12/2006 | Pedersen | 714/35 |
| 2007/0011656 A1 * | 1/2007 | Kumamoto | 717/124 |

OTHER PUBLICATIONS

Fortin, "Trap-Based Kernel Instrumentation Technique", IBM Technical Disclosure Bulletin, http://www.delphion.com/tdbs/tdb?order=95A+61382, Jul. 1995, pp. 243-246.

* cited by examiner

*Primary Examiner*—Eric Coleman
(74) *Attorney, Agent, or Firm*—Yee & Associates, P.C.; Matthew W. Baca

(57) ABSTRACT

A method, system and computer program product for managing a conditional data watchpoint in a set of instructions being traced is shown in accordance with illustrative embodiments. In one particular embodiment, the method comprises initializing a conditional data watchpoint and determining the watchpoint has been encountered. Upon that determination, examining a current instruction context associated with the encountered watchpoint prior to completion of the current instruction execution, further determining a first action responsive to a positive context examination; otherwise, determining a second action.

15 Claims, 2 Drawing Sheets

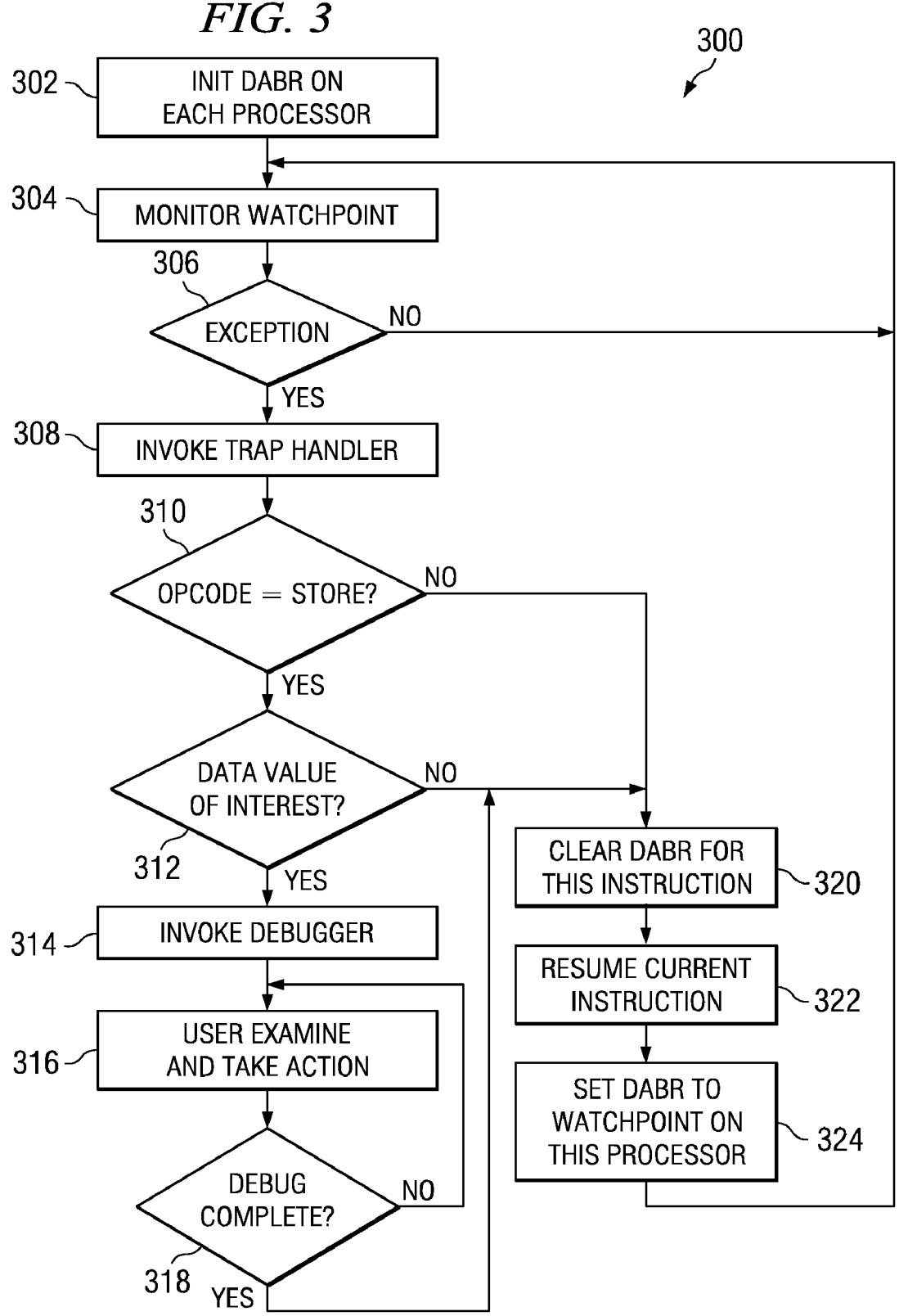

CONDITIONAL DATA WATCHPOINT MANAGEMENT

This invention was made with United States Government support under Agreement No. B519700 awarded by the Department of Energy (DOE)—All Management Operating Contractors (MOC's). The Government has certain rights in this invention.

BACKGROUND OF THE INVENTION

1. Field of the Invention

The present invention relates generally to an improved data processing system and, in particular, to a method, apparatus and computer program product for data address-based exception handling. Still more particularly, the present invention provides a method, system and computer program product for managing conditional data watchpoints.

2. Description of the Related Art

Currently in data processing, it is typical to have source level code debugging tools provide support for the setting of data address values as a "value of interest" to be tested, monitored, or watched. These data addresses are also known as a "watchpoints". The watchpoint may be set to a specified user address or user memory location within the effective address space of the process or program being traced and is applicable to either read or write mode operations.

Additional support for the monitoring and management of watchpoints may be provided by means of hardware assist typical with many current versions of processors. This hardware assist typically is in the form of a specific register designed to hold the memory address of the conditional data watchpoint. For example, all PowerPC systems, such as those available from International Business Machines Corporation, since the P4 version have, as a means of hardware support, a data address break register (DABR) to further enable conditional data watchpoint monitoring. The data address break register, or similar component of a processor, capability provides users with the ability to have the hardware of the processor monitor the conditional data watchpoint for a specified address and raise an exception when that address is encountered during instruction processing.

The data address break register, as an example, is a hardware component designed to aid in problem determination dealing with instruction execution. The register may be initialized through known programmatic means as a form of initiator, by the user to a desired value or there may be a hardware specific user interface. The processor hardware then monitors the value placed in the register and provides an event or exception whenever the value is encountered during instruction processing allowing problem determination processing to initiated.

When a data watchpoint has been set with the desired value, any load or store operation to that specified address will cause a hardware generated exception during the execution of a set of instructions in the program code being traced. The hardware exception will also cause the program execution to stop and typically a debugger to be notified. This process is then similar to that which is used in an instruction breakpoint. The debugger may then determine to notify the user based on the user's pre-defined criteria. Typical criteria indicate a user interest in watching for all changes in data values or only specific changes in data values.

While a user is typically interested in conditional data watchpoint monitoring, the user is notified only after the conditions have been met, causing the current watchpoint mechanism to appear to be slow. Every store operation to the specified address causes the debugger to be given control and all threads of the multi-threaded process being examined to stop while the examination of the event continues.

Many processors implement a "trap-after" semantic that provides an indication after the load or store instruction involving the watched memory location has completed. The "trap-after" semantic allows multiple threads updating the watched memory location to complete before the trap handler is called for the thread that caused the watchpoint exception. One approach to this problem is to suspend all but the current thread that hit the watchpoint, then resume all threads after taking action. This approach incurs added overhead of suspending and resuming multiple threads.

SUMMARY OF THE INVENTION

In an illustrative embodiment of the present invention, there is a method for managing a conditional data watchpoint in a set of instructions being traced. The method comprising: initializing the conditional data watchpoint; monitoring the conditional data watchpoint during execution of the set of instructions; responsive to encountering the conditional data watchpoint during the execution of the set of instructions, examining a current instruction context associated with the conditional data watchpoint prior to completing execution of the current instruction; and identifying a first action responsive to a positive context examination; otherwise, identifying a second action.

In another illustrative embodiment of the present invention, there is a data processing system for managing a conditional data watchpoint in a set of instructions being traced, the data processing system comprising: a bus; a memory connected to the bus; a storage device connected to the bus, wherein the storage device contains computer usable code; a communications unit connected to the bus; and a processing unit connected to the bus; wherein the processing unit executes the computer usable code to: initialize the conditional data watchpoint within the memory; monitor the conditional data watchpoint during execution of the set of instructions; responsive to encountering the conditional data watchpoint during the execution of the set of instructions, examine a current instruction context associated with the conditional data watchpoint prior to completing execution of the current instruction; and identify a first action responsive to a positive context examination; otherwise, identify a second action.

In yet another illustrative embodiment of the present invention there is a computer program product, for managing a conditional data watchpoint in a set of instructions being traced, the computer program product comprising: a computer usable recordable type medium having computer usable program code tangibly embodied thereon, the computer usable program code comprising: computer usable program code for initializing the conditional data watchpoint; computer usable program code for monitoring the conditional data watchpoint during execution of the set of instructions; computer usable program code responsive to encountering the conditional data watchpoint during the execution of the set of instructions, for examining a current instruction context associated with the conditional data watchpoint prior to completing execution of the current instruction; and computer usable program code for identifying a first action responsive to a positive context examination; otherwise, identifying a second action.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a flowchart of a data address exception handling process in accordance with illustrative embodiments.

DETAILED DESCRIPTION OF THE PREFERRED EMBODIMENT

Figure 1:
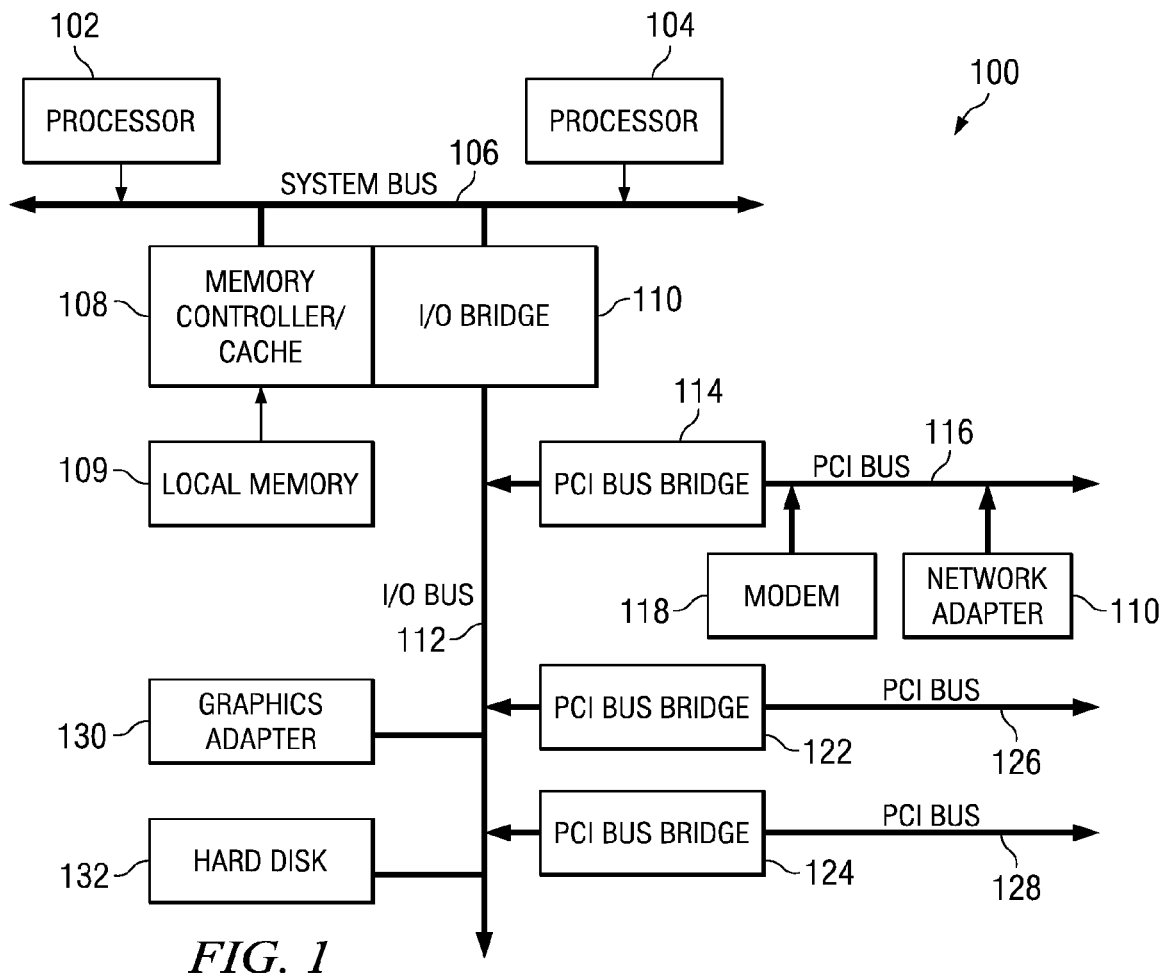
FIG. 1 is a schematic diagram of a data processing system in accordance with illustrative embodiments.

With reference now to the figures, and in particular with reference to FIG. 1, a schematic diagram of a data processing system in accordance with an embodiment of the present invention is depicted.

Data processing system 100 may be a symmetric multiprocessor (SMP) system including a plurality of processors 102 and 104 connected to system bus 106. Alternatively, a single processor system may be employed. Also connected to system bus 106 is memory controller/cache 108, which provides an interface to local memory 109. I/O bus bridge 110 is connected to system bus 106 and provides an interface to I/O bus 112. Memory controller/cache 108 and I/O bus bridge 110 may be integrated as depicted.

Peripheral component interconnect (PCI) bus bridge 114 connected to I/O bus 112 provides an interface to PCI local bus 116. A number of modems 118-120 may be connected to PCI bus 116. Typical PCI bus implementations will support four PCI expansion slots or add-in connectors. Communications links to network computers may be provided through modem 118 and network adapter 120 connected to PCI local bus 116 through add-in boards.

Additional PCI bus bridges 122 and 124 provide interfaces for additional PCI buses 126 and 128, from which additional modems or network adapters may be supported. In this manner, system 100 allows connections to multiple network computers. A memory mapped graphics adapter 130 and hard disk 132 may also be connected to I/O bus 112 as depicted, either directly or indirectly.

Those of ordinary skill in the art will appreciate that the hardware depicted in FIG. 1 may vary. For example, other peripheral devices, such as optical disk drive and the like also may be used in addition or in place of the hardware depicted. The depicted example is not meant to imply architectural limitations with respect to the present invention.

The data processing system depicted in FIG. 1 may be, for example, an IBM RISC/System 6000 system, a product of International Business Machines Corporation in Armonk, N.Y., running the Advanced Interactive Executive (AIX) operating system.

Processors 102 and 104, for example, each provide an implementation of the data address break register support service.

Figure 2:
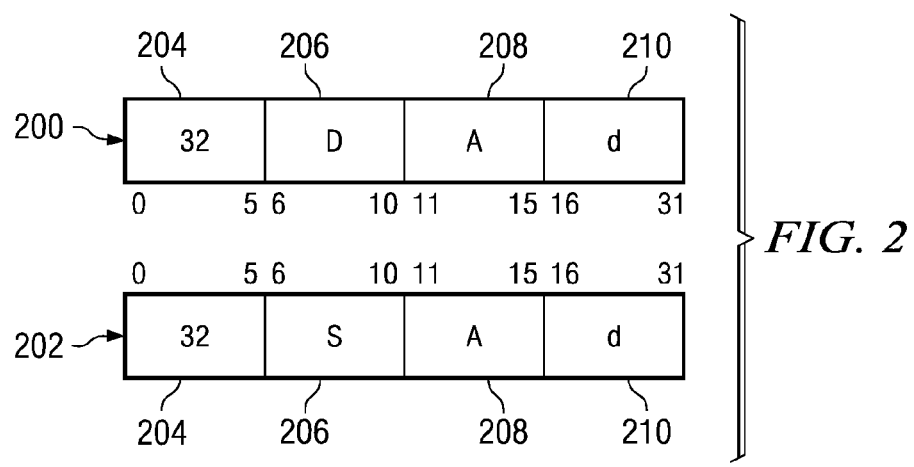
FIG. 2 is a block diagram of a typical layout of instructions as executed by the data processing system of FIG. 1 in accordance with illustrative embodiments.

With reference now to FIG. 2, a block diagram of a typical layout of instructions as executed by the data processing system of FIG. 1 is shown in accordance with illustrative embodiments.

Instruction 200 is an example of "load word and zero" instruction showing a typical arrangement of fields. Fields 204, 206, 208 and 210 correspond to the operation code (opcode), first register, second register, and displacement/remainder of the instruction, respectively. Field 204 represents the operation code, or instruction type, of the specific instruction and may be indicative of particular interest, in illustrative embodiments, such as a load or store operation.

Field 206 representing a first register indicates where the data value of the instruction is to be stored, the "store to" location as in instruction 200 or the "data value" to be stored as in "store word" instruction 202. Similarly, field 208 representing a second register of the instruction may also have a different meaning depending upon the operation code of the specific instruction. For example in instruction 200, second register field 208 contains the "load from" address to be used to perform the load operation. Field 210 contains the displacement or offset from the address found in second register field 208 and other information of no particular interest in this example.

In instruction 202, field 208 of the second register contains the "to address" indicating the target location into which the data is to be stored. Further, field 210 of instruction 202 contains a displacement or offset from the "to address" indicating the desired target storage location.

Examining these instructions would allow one to determine, in the event of a store operation, what data would be stored and at which location. Both of these pieces of information may prove useful when performing problem determination or application flow verification and debugging operations.

Performance of a trace and debug process may be further improved through use of a trap in the form of a trap handler within the traced process that is given control, rather than the debugger, when a hardware exception is generated. The trap handler may also be given context data allowing the trap handler to monitor the conditional data watchpoint and determine what action to take when the conditional data watchpoint condition is met.

In a preferred embodiment, instructions that execute and store to a memory location would have "trap-before" semantics. "Trap before" allows the processor to generate a hardware-based exception for the data watchpoint before the instruction performing the store type operation completes execution.

The trap handler provides the capability to examine and evaluate components of the specific instruction causing the conditional data watchpoint exception. The trap handler logic comprises a comparator for comparing the instruction component values with those of user provided predetermined values. For example the opcode component of the specific instruction would be compared to the predetermined store type opcode and a determination made regarding a choice of actions. Further context data related to the instruction may be factored into the determination as well.

Referring now to FIG. 3, is a flowchart of a data address break exception handling process shown in accordance with illustrative embodiments. The data address break exception handling is a combination of the existing hardware support of the data address break register with additional logic provided to support the use of the trap handler. The enhanced support of the new process enables selective entry into the debug environment while tracing a set of instructions in a program flow.

Enabling selective entry reduces the overhead of invoking the debug environment unless actually needed. The data value of interest triggers only one call to the debugger after each change in the data value is examined by the trap handler of the traced process, thereby ensuring efficient debugging. The selective enablement is determined by examination of the current instruction that caused the watchpoint exception to occur, before completion of the current instruction execution, and the data value in the register. Using a combination of hardware and software one is then able to more accurately detect when a predetermined condition requiring the debug environment has been met. If the specific condition has not been met, tracing may continue without the unnecessary overhead of invoking the debug environment.

Process 300 begins as the data address break register, a specialized hardware feature as is known, is initialized with the desired data address value, establishing the conditional data watchpoint, to be monitored by the hardware, for example, of processors 102 and 104 of data processing system 100 shown in FIG. 1 (step 302). The desired conditional data watchpoint is monitored by the processor hardware (step 304) wherein process 300 determines a conditional data watchpoint match and therefore causing an exception to be generated (step 306). If an exception is generated ("yes" at step 306), process 300 continues with invocation of the trap handler (step 308). If no exception is generated ("no" at step 306), process 300 reverts to step 304. The trap handler analyzes the current instruction before the current instruction execution completes and determines if the instruction opcode component is representative of the store type operation of interest (step 310). Depending upon the specific opcode component value, the content of first register component may represent the data to be stored into the watched location while the other register and offset components represent the watched location address and offset value from that address. Necessary logic to handle at least both types of instructions previously described is available within the context handling capability of the trap handler. The comparator component of the trap handler determines if the opcode component value of the analyzed instruction matches the desired store type opcode component. If "yes" at step 310, process 300 then determines if the register containing the data value to be stored is of further interest and to be examined for a match, again using the comparator (step 312). Having matched both the store type opcode component and the data value component criteria, a positive context examination results, a first action is identified and the debug environment is invoked (step 314).

The user, or programmatic means of the debugger, is allowed to examine the data of interest and perform further actions as necessary (step 316). A determination is made if the debugging is complete (step 318). If the debug process is not complete ("no" to step 318), process 300 returns to step 316. If the debug process is complete ("yes" to step 318), process 300 proceeds to clear the data address break register for this instruction on this processor (step 320). Process 300 restores the current instruction to resume execution in the set of instructions of the traced process (step 322), and re-sets the data address break register to the conditional data watchpoint on this processor (step 324), with process 300 returning to step 304 in which the processor hardware resumes monitoring the conditional data watchpoint occurs Returning now to steps 310 and 312, if the opcode component of the analyzed instruction does not match the desired store type opcode ("no" to step 310) or if the register containing the data value to be stored is not of further interest and therefore not to be examined for a match ("no" to step 312), a negative context results, and a second action identified as process 300 proceeds to step 320. It is also noted that since the register context is unique for each thread that activates a watchpoint, concurrent updates to the watched location in memory by multiple threads does not require serialization as before.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Illustrative embodiments provide enhanced conditional data watchpoint management. In particular enhancement of the previous hardware exception handling process related to conditional data watchpoints to provide additional capabilities of the exemplary trap handler and "trap before" semantics reduces the need to call the debug environment. Avoiding unnecessary calls to the debug environment typically saves time allowing the processor to be more productive.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include recordable type media comprising a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a transmission type medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing a conditional data watchpoint in a set of instructions being traced, the method comprising:
    initializing the conditional data watchpoint;
    monitoring the conditional data watchpoint during execution of the set of instructions;
    responsive to encountering the conditional data watchpoint during the execution of the set of instructions, causing an exception to be generated;
    responsive to causing an exception to be generated, examining a current instruction context associated with the conditional data watchpoint prior to completing execution of a current instruction; and
    identifying a first action responsive to a positive context examination; otherwise,
    identifying a second action.

2. The method of claim 1, examining a current instruction context associated with the conditional data watchpoint prior to completing execution of the current instruction further comprises:
    comparing an opcode component with a storage type predetermined value; and
    comparing a data value component with a predetermined data value.

3. The method of claim 2 wherein identifying the first action, responsive to the positive context examination, further comprises an instance of both the opcode component and the data value component matching their respective predetermined values.

4. The method of claim 1 wherein identifying a first action invokes a debugging environment.

5. The method of claim 1 wherein identifying a second action resumes execution of the current instruction of the set of instructions being traced.

6. A data processing system for managing a conditional data watchpoint in a set of instructions being traced, the data processing system comprising:
    a bus;
    a memory connected to the bus;
    a storage device connected to the bus, wherein the storage device contains computer usable code;
    a communications unit connected to the bus; and
    a processing unit connected to the bus; wherein the processing unit executes the computer usable code to:
        initialize the conditional data watchpoint within the memory;
        monitor the conditional data watchpoint during execution of the set of instructions;
        responsive to encountering the conditional data watchpoint during the execution of the set of instructions, examine a current instruction context associated with the conditional data watchpoint prior to completing execution of the current instruction; and
        identify a first action responsive to a positive context examination; otherwise,
        identify a second action.

7. The data processing system of claim 6, wherein examine the current instruction context associated with the encountered conditional data watchpoint, further comprises:
    comparison of an opcode component with a storage type predetermined value; and
    comparison of a data value component with a predetermined data value.

8. The data processing system of claim 7 identify the first action, responsive to the positive context examination, further comprises an instance of both the opcode component and the data value component matching their respective predetermined values.

9. The data processing system of claim 6 wherein identify a first action invokes a debugging environment.

10. The data processing system of claim 6 wherein identify a second action causes resumption of execution of the current instruction of the set of instructions being traced.

11. A computer program product, for managing a conditional data watchpoint in a set of instructions being traced, the computer program product comprising:
    a computer usable recordable type medium having computer usable program code tangibly embodied thereon, the computer usable program code comprising:
    computer usable program code for initializing the conditional data watchpoint;
    computer usable program code for monitoring the conditional data watchpoint during execution of the set of instructions;
    computer usable program code responsive to encountering the conditional data watchpoint during the execution of the set of instructions, for examining a current instruction context associated with the conditional data watchpoint prior to completing execution of the current instruction; and
    computer usable program code for identifying a first action responsive to a positive context examination; otherwise,
    identifying a second action.

12. The computer program product of claim 11, wherein computer usable program code for examining a current instruction context associated with the conditional data watchpoint prior to completing execution of the current instruction, further comprises computer usable program code for:
    comparison of an opcode component with a storage type predetermined value; and
    comparison of a data value component with a predetermined data value.

13. The computer program product of claim 11, wherein computer usable program code for determining the first action responsive to the positive context examination further comprises computer usable program code for determining an instance of both the opcode component and the data value component matching their respective predetermined values.

14. The computer program product of claim 11 wherein computer usable program code for identifying a first action further comprises computer usable program code for invoking a debugging environment.

15. The computer program product of claim 11 wherein the computer usable program code for identifying a second action further comprises computer usable program code for resumption of execution of the current instruction of the set of instructions being traced.

* * * * *